(12) United States Patent
Citti et al.

(10) Patent No.: US 8,263,514 B2
(45) Date of Patent: Sep. 11, 2012

(54) SINTERED PRODUCT BASED ON ALUMINA AND CHROMIUM OXIDE

(75) Inventors: Olivier Citti, Wellesley, MA (US); Julien Fourcade, Shrewsbury, MA (US)

(73) Assignee: D'Etudes Europeen, Coubevoie (FR)

( * ) Notice: Subject to any disclaimer, the term of this patent is extended or adjusted under 35 U.S.C. 154(b) by 206 days.

(21) Appl. No.: 12/666,488

(22) PCT Filed: Jul. 10, 2008

(86) PCT No.: PCT/IB2008/052783
§ 371 (c)(1),
(2), (4) Date: Mar. 10, 2010

(87) PCT Pub. No.: WO2009/007933
PCT Pub. Date: Jan. 5, 2009

(65) Prior Publication Data
US 2010/0179051 A1 Jul. 15, 2010

(30) Foreign Application Priority Data
Jul. 11, 2007 (FR) ...................... 07 56426

(51) Int. Cl.
*C04B 35/00* (2006.01)
(52) U.S. Cl. .................. 501/127; 501/132; 501/153
(58) Field of Classification Search .................. 501/126, 501/127, 132, 153
See application file for complete search history.

(56) References Cited

U.S. PATENT DOCUMENTS

| 3,585,058 A | * | 6/1971 | Reardon ...................... 501/127 |
| 4,823,359 A | | 4/1989 | Ault et al. |
| 5,322,826 A | | 6/1994 | Becker et al. |
| 6,352,951 B1 | | 3/2002 | Mossal et al. |
| 6,372,679 B1 | * | 4/2002 | Hirata et al. .................. 501/132 |

FOREIGN PATENT DOCUMENTS

| EP | 1 018 494 A1 | 7/2000 |
| JP | A-54-043909 | 4/1979 |
| JP | A-03-208863 | 9/1991 |
| JP | A-2003-089574 | 3/2003 |

OTHER PUBLICATIONS

Jain, PL. Principles of Foundry Technology, Fourth Edition. Tata McGraw-Hill, 2003. p. 82.*
International Search Report issued in International Patent Application No. PCT/IB2008/052783 on Dec. 9, 2008.
Written Opinion of the International Searching Authority issued in International Patent Application No. PCT/IB2008/052783 on Dec. 9, 2008.

* cited by examiner

*Primary Examiner* — Noah Wiese
(74) *Attorney, Agent, or Firm* — Oliff & Berridge, PLC

(57) ABSTRACT

The invention provides a sintered product presenting an apparent density greater than 4.00 g/cm$^3$ and having the following mean chemical composition, as a percentage by weight based on the oxides and for a total of 100%:
$Al_2O_3$: complement to 100%
$16\% \leq Cr_2O_3 \leq 29.5\%$
$TiO_2$ in a quantity such that the $Cr_2O_3/TiO_2$ weight ratio is greater than 16 and less than 35, other species: $\leq 1\%$
Application as an electrode bushing block.

20 Claims, No Drawings

SINTERED PRODUCT BASED ON ALUMINA AND CHROMIUM OXIDE

TECHNICAL FIELD

The invention relates to novel sintered products produced from alumina and chromium oxide, to a method of their production, and to their use, especially in a glass furnace and in an electrolysis cell.

STATE OF THE ART

Refractory products include fused cast products and sintered products.

In contrast to sintered products, fused cast products usually comprise a very substantial intergranular vitreous phase which fills in the matrix of crystalline grains. The problems encountered by sintered products and fused cast products in their respective applications and the technical solutions adopted to overcome them are thus generally different. Further, because there are substantial differences between the production methods, a composition developed to produce a fused cast product cannot a priori be used per se to produce a sintered product, and vice versa.

Sintered products are obtained by mixing suitable starting materials then forming a green mixture and firing the resulting green part at a temperature and for a time that are sufficient to sinter the green part.

Sintered products are intended for a variety of industries, depending on their chemical compositions.

In the context of incinerators, for example, U.S. Pat. No. 6,352,951 describes blocks based on alumina and chromium that also contain zirconia.

In the context of glass furnaces, U.S. Pat. No. 4,823,359 discloses coatings constituted by alumina and chromium which have good resistance to corrosion and erosion by slag and fused glass. Titanium oxide is not mentioned, nor is electrical resistivity.

In one particular application, the refractory block termed the "electrode bushing block" supports an electrode of an electric furnace for fusing glass. Thus, not only must it be able effectively to resist corrosion by the fused glass with which it comes into contact, but it also must have high electrical resistivity at operating temperatures, generally in the range 1450° C. to 1500° C., to reduce the amount of leakage current. Thus, rapid degradation of the refractory material near the electrode is avoided, in particular degradation of the refractory material constituting the electrode bushing block.

The current development of very high quality glass, requiring high fusion temperatures and thus ever higher electrical energies, increases the demands on refractory products for glass furnaces and especially on products used as electrode bushing blocks. Thus, there exists a need for a novel refractory product that has good resistance to corrosion by fused glass, and high electrical resistivity, especially at temperatures of about 1500° C.

The present invention aims to satisfy this need.

SUMMARY OF THE INVENTION

To this end, the invention proposes a sintered product, preferably presenting an apparent density greater than 4.00 $g/cm^3$, and having the following mean chemical composition, as a percentage by weight based on the oxides and for a total of 100%:

61.8%$\leq Al_2O_3 \leq$98.3%, and more generally $Al_2O_3$: complement to 100%

1.6%$\leq Cr_2O_3 \leq$35%, preferably 16%$\leq Cr_2O_3$ and/or $Cr_2O_3 \leq$29.5%

0.1%$\leq TiO_2 \leq$2.2%, and in a quantity such that the $Cr_2O_3/TiO_2$ weight ratio is greater than 16, and, preferably, less than 35, Other species: $\leq$1%.

Unexpectedly, the inventors have discovered that modifying the $Cr_2O_3/TiO_2$ weight ratio can result in remarkable performance, in particular a very good compromise between resistance to corrosion by fused glass and electrical resistivity at a temperature of about 1500° C.

Thus, the product of the invention preferably has a $Cr_2O_3/TiO_2$ weight ratio greater than 16.2, preferably greater than 17 and more preferably greater than 19, greater than 21 or greater than 24, or even greater than 26 or 28, and/or less than 32, preferably less than 30. A $Cr_2O_3/TiO_2$ weight ratio of about 28.5 appears optimal.

It is thus well suited to application as an electrode bushing block, in particular when it is intended to come into contact with fused glass such as reinforcing glass (E glass) and electronic glass. The latter is primarily intended for the manufacture of flat screens for televisions or computers.

Preferably, the product of the invention also exhibits one or more of the following optional characteristics:

- the alumina, $Al_2O_3$, content is 61.8% or more, greater than 63%, preferably greater than 65%, more preferably greater than 69% and/or 98.3% or less, less than 80%, preferably less than 75%. More preferably, the alumina content is about 70%; whatever the considered embodiment, alumina is the complement to 100% of $Cr_2O_3$, $TiO_2$, and "other species".
- the chromium oxide, $Cr_2O_3$, content is greater than 20%, preferably greater than 24%, more preferably greater than 26% and/or less than 33%, preferably less than 30%; this content is preferably less than 29.5%, and, as variants, may be less than 29%, or even less than 28%. preferably 0.1% $\leq TiO_2$ and/or $TiO_2 \leq$2.2%.
- the titanium oxide, $TiO_2$, content is greater than 0.15%, preferably greater than 0.2%, more preferably greater than 0.4%, preferably greater than 0.46%, preferably greater than 0.54%, still more preferably greater than 0.9% and/or less than 2%, preferably less than 1.5%, more preferably about 1%;
- the open porosity is less than 0.5%, preferably less than 0.1%;
- the sintered product has an apparent density greater than 4 $g/cm^3$ [gram/cubic centimeter];
- the sintered product has electrical resistivity, measured at 1500° C. and at a frequency of 100 Hz [hertz], that is greater than 250 $\Omega \cdot cm$ [Ohm-centimeter], preferably greater than 500 $\Omega \cdot cm$;
- the sintered product has electrical resistivity, measured at 950° C. and at a frequency of 100 Hz, that is greater than 30,000 $\Omega \cdot cm$, preferably greater than 35,000 $\Omega \cdot cm$, more preferably greater than 40,000 $\Omega \cdot cm$, or even greater than 50,000 $\Omega \cdot cm$;
- the sintered product has an index Ic of resistance to corrosion by an E glass, as defined in the test below, of 120 or more, preferably greater than 250;
- the sintered product is in the form of a block, preferably with a mass greater than 5 kg [kilogram], preferably greater than 10 kg;
- the sintered product presents a single phase, said phase being a solid solution chromium oxide-alumina.

The invention also provides a method of producing a sintered product comprising the following steps:
a) mixing starting materials to form a starting charge;
b) forming a green part from said starting charge;
c) sintering said green part to obtain said sintered product;
the method being noteworthy in that the starting charge is determined such that said product is in accordance with the invention.

Preferably, the method of the invention also exhibits one or more of the following optional characteristics:
the median size of the starting materials used is less than 100 μm [micrometer], preferably less than 50 μm;
the starting charge includes at least 10% and/or less than 30% of chamotte, as a percentage by weight based on the dry weight of the starting charge;
forming is carried out by isostatic pressing.

The invention also provides a product produced or capable of being produced by the method of the invention.

Finally, the invention provides the use of a refractory product in accordance with the invention, or produced or capable of being produced using a method in accordance with the invention:
in a glass furnace, in particular in zones of the furnace which may come into contact with molten glass, in particular with glass with electrical resistivity of the order of 20 Ω·cm to 30 Ω·cm at 1500° C. and at a frequency of 100 Hz, in particular with E glass, and/or with glass which is more resistive than E glass; and/or
in applications in which it is desired to have electrical resistivity greater than 250 Ω·cm, preferably greater than 300 Ω·cm, more preferably greater than 500 Ω·cm at 1500° C. and at a frequency of 100 Hz, in particular in an electrolysis furnace, especially for the production of aluminum and in particular in zones in which the product may come into contact with the electrolyte bath.

Thus, the invention particularly provides the use of such a product as an "electrode bushing block" or as an element in an electrolysis cell.

DETAILED DESCRIPTION

Other characteristics and advantages of the invention become apparent from the following detailed description.

The term "impurities" means inevitable constituents introduced necessarily with the starting materials or resulting from reactions with those constituents. The impurities are not necessary constituents, but are merely tolerated.

The term "temporary" means "eliminated from the product during sintering".

The term "size" of a grain or a particle denoted the mean of its largest dimension dM and its smallest dimension dm: (dM+dm)/2.

Conventionally, the term "median particle or grain size" of a mixture of particles or an assembly of grains denotes the size dividing the particles of that mixture or the grains of that assembly into first and second populations that are equal in number, said first and second populations comprising only particles or grains with a size that is respectively greater than or less than the median size.

An E glass has the following chemical analysis, in accordance with American standard ASTM D 578-05, <<Standard Specification for Glass Fiber Strands>>, (as a percentage by weight):

| | |
|---|---|
| $B_2O_3$ | 0-10% |
| CaO | 16-25% |
| $Al_2O_3$ | 12-16% |
| $SiO_2$ | 52-62% |
| MgO | 0-5% |
| alkaline oxides | 0-2% |
| $TiO_2$ | 0-1.5% |
| $Fe_2O_3$ | 0.05-0.8% |
| fluorine | 0-1% |

Unless otherwise mentioned, all of the percentages are percentages by weight, based on the oxides when reference is made to the sintered product, and on the dry weight of the starting charge when reference is made to that charge.

A product in accordance with the invention may be produced using steps a) to c) described above.

These steps are conventional but, in step a), the starting charge is determined in a manner that is known to the skilled person, so that the sintered product obtained at the end of step c) has $Al_2O_3$, $Cr_2O_3$, and $TiO_2$ contents that are within the ranges of the invention as described above, in particular within the preferred ranges, while complying with the constraints imposed on the $Cr_2O_3/TiO_2$ ratio by weight.

In the current position of research, the $Cr_2O_3/TiO_2$ ratio by weight should also be less than 50, preferably less than 35, still preferably less than 32, preferably less than 30.

Complying with these conditions improves corrosion resistance and electrical resistivity.

Alumina is the "complement to 100%". Therefore $61.8\% \leq Al_2O_3 \leq 98.3\%$ when $1.6\% \leq Cr_2O_3 \leq 35\%$, $0.1\% \leq TiO_2 \leq 2.2\%$; and
other species": $\leq 1\%$.

A minimum amount of 0.1% of $TiO_2$ is considered to be necessary to obtain a useful technical effect.

Preferably, the starting charge is also determined so that the amount of "other species" in the sintered product, i.e. species other than $Al_2O_3$, $Cr_2O_3$, and $TiO_2$, is less than 1.0%, preferably less than 0.7%, more preferably less than 0.5%, still more preferably less than 0.2%, as a percentage by weight based on the oxides.

Preferably, the "other species" are constituted by impurities, i.e. no species other than $Al_2O_3$, $Cr_2O_3$, and $TiO_2$ is introduced into the starting charge with the aim of modifying the composition of the sintered product. In amounts of less than 1.0% in the sintered product, as a percentage by weight based on the oxides, it is assumed that the presence of impurities does not substantially modify the result obtained. Preferably, the total amount of impurities is less than 0.7%, more preferably less than 0.5%, as a percentage by weight based on the oxides.

In particular, the impurities include $Fe_2O_3$, $SiO_2$, MgO, CaO, and alkaline oxides such as $Na_2O$.

Preferably, the starting charge is determined so that, in the sintered product, as a percentage by weight based on the oxides, $Fe_2O_3+SiO_2+MgO+CaO+$ "alkaline oxides" is less than 0.7%, or even less than 0.5%, or less than 0.4%. Preferably, the total content of the oxides $Fe_2O_3+SiO_2+MgO$ is less than 0.7%, or even less than 0.5%, or less than 0.4%.

Preferably, the starting charge is determined so that, in the sintered product, as a percentage by weight based on the oxides, the content of at least one of the oxides $Fe_2O_3$, $SiO_2$, MgO, CaO and $Na_2O$, and preferably the content of each of the oxides $Fe_2O_3$, $SiO_2$, MgO, CaO and $Na_2O$, is less than 0.5%, preferably less than 0.4%, less than 0.2%, less than 0.1%, preferably less than 0.08%. In particular, preferably $Fe_2O_3$<0.2%, preferably $Fe_2O_3$<0.1%, and more preferably $Fe_2O_3$<0.08%.

The starting charge is also determined so that the oxides preferably represent greater than 99.9% by weight of the sintered product, preferably about 100% of the weight of the sintered product.

Preferably, the dry starting charge is constituted by a powder with a median size of less than 100 μm, preferably less than 50 μm. Preferably, the starting materials used themselves have a median size of less than 100 μm, preferably less than 50 μm. Thus, densification of the part during the sintering step is advantageously improved.

Particularly high densities may be obtained using alumina, chromium oxide and titanium oxide powders having a median size less than 10 μm, or even less than 5 μm.

The starting charge also preferably comprises at least 10% and less than 30% of chamotte. The structure of the chamotte grains advantageously improves compacting during formation of the green part.

In addition to the starting materials that are measured out so that the sintered product has the desired mean chemical composition by weight, as is conventional, the starting charge may also include the usual deflocculating agents and/or binders, for example phosphoric acid.

In step b), the mixture prepared in step a) may be cast into a mold, then formed to produce a green part.

Preferably, the conformation of the mold is such that the sintered product obtained is in the form of a block with a mass greater than 5 kg [kilogram], preferably greater than 10 kg. Said blocks are suitable for the envisaged applications, in particular to constitute electrode bushing blocks.

By way of example, forming may be the result of isostatic pressing, casting slip, uniaxial pressing, gel casting, vibrocasting, or a combination of those techniques.

Preferably, it results from isostatic pressing at pressures greater than 100 MPa [Megapascal]. That technique can result in more reactive sintering and produces denser products. The open porosity of the sintered products may thus be less than 0.5%, preferably less than 0.1%. Their apparent density may be greater than $4.00 g/cm^3$, i.e. greater than 249.7 pcf.

The green part is sintered in step c).

Sintering is preferably carried out at a temperature in the range 1400° C. to 1700° C., in a reducing or oxidizing atmosphere, preferably at atmospheric pressure.

Following sintering, a sintered product is obtained that is in accordance with the invention.

Advantageously, the sintered product has an index Ic of resistance to corrosion by a glass for reinforcing fibers (E type glass), at 1500° C., and in accordance with the test defined below, that is greater than 120, preferably greater than 200, more preferably greater than 250, or even greater than 260.

The sintered product also has electrical resistivity, measured at 1500° C. and at a frequency of 100 Hz, that is greater than 250 Ω·cm, preferably greater than 300 Ω·cm, or even greater than 500 Ω·cm. In the preferred implementations, this resistivity may even exceed 600 Ω·cm or even may exceed 650 Ω·cm, with an index Ic greater than 260, or even greater than 280, or exceed 1000 Ω·cm, with an index Ic greater than 230.

Excellent performance is obtained when the product is produced from a starting charge containing 20% to 30%, or between 20% and 29.5% of $Cr_2O_3$ and when the $Cr_2O_3/TiO_2$ weight ratio is greater than 19.

The following non-limiting examples are given with the aim of illustrating the invention.

In these examples, the following starting materials were employed; the percentages given are percentages by weight:
alumina with a median particle size of about 3 μm;
chromium oxide containing about 99.5% $Cr_2O_3$ and with a median particle size of 2.8 μm;
titanium oxide containing about 95% $TiO_2$ and with a median particle size of 2.3 μm.

Sintered refractory blocks were produced in accordance with steps a) to c) described above.

In step b), the mixture was formed by isostatic pressing to form green parts with dimensions of 100 mm [millimeter]× 100 mm and with a height of about 150 mm.

In step c), the green parts were then sintered in a reducing atmosphere, at atmospheric pressure and at a sintering temperature of 1550° C. with a constant temperature stage of 20 h [hours].

To measure corrosion resistance, samples in the form of cylindrical bars of product 22 mm in diameter and 100 mm in height were removed and underwent a test consisting of rotating the samples immersed in a bath of molten E glass for reinforcing fibers, heated to 1500° C. The rotation rate about the axis of the sample carrier was 6 rpm [revolutions per minute]. (This rotation rate corresponded to a linear velocity close to 4 or 5 times greater than the maximum values observed in a glass furnace. Such a velocity thus allowed the corrosion interface to be renewed frequently and thus renders the test much more challenging). The test duration was 48 hours. At the end of that period, the remaining volume of the corroded sample was determined for each sample. The remaining volume of a corroded sample of the reference product (Example 1) was selected as a basis for comparison. The ratio of the remaining volume of a corroded sample to the remaining volume of the corroded reference sample, multiplied by 100, provided a value for the corrosion resistance of the test sample compared with that of the reference product. "Ic" designates the corrosion index thus defined, indicated in Table 1 and in the claims.

Values greater than 100 thus represent a smaller loss by corrosion than that of the reference product. The products in question thus have better resistance to corrosion by fused glass than the reference sample. Values of less than 100 represent a higher corrosion loss than that of the reference product. The products in question thus have a resistance to corrosion by fused glass which is lower than that of the reference sample. It was assumed that corrosion resistance was particularly satisfactory when the corrosion index Ic was 120 or more (based on Example 1).

In the various examples of blocks thus produced, 30 mm diameter and 30 mm high cylindrical bars of product were removed and subjected to a potential difference of 1 volt at a frequency of 100 Hertz at 1500° C. (or 1400° C.) to carry out the electrical resistivity measurements, denoted "R" in Table 1 below, in Ω·cm. It was assumed that electrical resistivity was particularly satisfactory when R was 250 Ω·cm or more at 1500° C.

Example 1, the reference product, was the product ZS1300 sold by Saint-Gobain SEFPRO. It is a zircon-based product that contains 65.9% zirconium, 32.1% silica, 1.2% titanium oxide and 0.3% alumina. It is currently the most widely used product in the hearths of electrode furnaces.

The mean chemical analysis of the various test products and the test results are shown in Table 1 (percentages by weight based on the oxides). The total impurities content is not shown in the table: however, it was less than 0.6%.

TABLE 1

| N° | Composition by weight % Al$_2$O$_3$ | % Cr$_2$O$_3$ | % TiO$_2$ | Cr$_2$O$_3$/TiO$_2$ (weight ratio) | Density (g/cm$^3$) | Ic | R at 1500° C. (ohm·cm) | R at 1400° C. (ohm·cm) |
|---|---|---|---|---|---|---|---|---|
| 1 | | | | | 4.3 | 100 | 3000 | 5000 |
| 2 | 80 | 19 | 1 | 19.0 | 4.05 | 123 | 2290 | 5330 |
| 3 | 70 | 26 | 4 | 6.5 | 3.96 | 109 | 200 | 402 |
| 4 | 72.7 | 26 | 1.3 | 20.0 | 4.1 | 235 | 1021 | 2022 |
| 5 | 70 | 28.5 | 1.5 | 19.0 | 4.14 | 264 | 692 | 2200 |
| 6 | 70 | 29 | 1 | 29.0 | 4.16 | 283 | 670 | 1304 |
| 7 | 65 | 31 | 4 | 7.8 | 4.02 | 163 | 142 | 259 |
| 8 | 67.3 | 31 | 1.7 | 18.2 | 4.15 | 260 | 408 | 773 |
| 9 | 62 | 35 | 1.5 | 23.3 | 4.22 | 293 | 260 | 544 |
| 10 | 62 | 36 | 2 | 18.0 | 4.19 | | 187 | 302 |
| 11 | 80.8 | 19 | 0.2 | 95 | 3.68 | 82 | 1697 | 2816 |
| 12 | 80.5 | 19 | 0.5 | 38 | 4.03 | 105 | 1790 | 3344 |
| 13 | 79 | 19 | 2 | 9.5 | 4.02 | 106 | 1156 | 2172 |

Table 1 and a comparison of Examples 3 and 4, 7 and 8 show that it is possible to obtain values of Ic greater than 120 and of R (at 1500° C.) greater than 250 Ω·cm provided that the Cr$_2$O$_3$/TiO$_2$ weight ratio is greater than 16. Examples 7 to 10 however show that beyond 29.5% Cr$_2$O$_3$, the value of R reduces considerably. The examples 11 and 12 also show that the Cr$_2$O$_3$/TiO$_2$ weight ratio should be more than 16 and that the Cr$_2$O$_3$ content should preferably be less than 29.5%, but also that the Cr$_2$O$_3$/TiO$_2$ weight ratio should preferably be less than 35 to lead to a very high electrical conductivity, and in particular to an electrical resistivity R at 1500° C. greater than 500 Ωcm.

According to the invention, an optimum result is obtained with products 4 and 6, product 6 being the most preferred. The preferred characteristics of the product of the invention thus correspond to products 4 and 6.

Thus, the products of the invention can be used at higher temperatures than the reference product. Glass production temperatures can thus advantageously be increased to increase productivity and/or glass quality.

The products of the invention can advantageously be used in any other application requiring a refractory product having high electrical resistivity. In particular, such products may be useful in constructing an electrolysis cell, especially for the production of aluminum by electrolysis of alumina in solution in a bath of molten cryolite.

The cell may comprise a side wall and a bottom. The bottom is composed of refractory bottom blocks and cathode blocks and, in the lower portion, insulating blocks. The side wall is formed from refractory side blocks surrounded by a metal envelope or casing, which is insulated to a greater or lesser extent.

The electrolyte bath contained in the electrolysis cell is conventionally in contact with the bottom blocks, the cathode blocks and at least some of the side blocks. Said blocks are thus subjected to temperatures that may reach 950° C.

The electrical resistivities at 950° C. of Examples 5 and 8 of the invention were thus compared with that of a reference block based on silicon carbide (SiC) bonded with a matrix of silicon nitride (Si$_3$N$_4$) using the protocol described above, but at a temperature of 950° C.

The electrical resistivity at 950° C. of Example 5 was 50,500 Ω·cm and that of Example 8 was 35,615 Ω·cm, while that of the reference block was 6,000 Ω·cm.

The resistance to corrosion by the cryolitic bath (NaAlF$_6$+ AlF$_3$+Al$_2$O$_3$+CaF$_2$) was determined by keeping samples of the reference block and of Examples 5 and 8 having a cross section of 25×25 mm for 22 hours at 1030° C. in a molten cryolite bath. The samples from Examples 5 and 8 had a corroded volume (reduction in volume resulting from corrosion) that was at most half that of the reference block.

The refractory products of the invention are thus highly suitable for use in an electrolysis cell, especially for aluminum, in particular as an element in a side wall of such a cell and/or in a zone where they may come into contact with molten cryolite.

Clearly, the present invention is not limited to the implementations described and presented by way of non-limiting, illustrative examples.

The invention claimed is:

1. A sintered product presenting an apparent density greater than 4.00 g/cm$^3$ and having the following mean chemical composition, as a percentage by weight based on the oxides and for a total of 100%:
    Al$_2$O$_3$: complement to 100%
    16%≦Cr$_2$O$_3$≦29.5%
    TiO$_2$ in a quantity such that the Cr$_2$O$_3$/TiO$_2$ weight ratio is greater than 16 and less than 35, and
    other species: ≦1%.

2. A product according to claim 1, wherein Cr$_2$O$_3$/TiO$_2$ is more than 21.

3. A product according to claim 1, having a Cr$_2$O$_3$/TiO$_2$ weight ratio greater than 26.

4. A product according to claim 1 having a Cr$_2$O$_3$/TiO$_2$ weight ratio less than 32.

5. A product according to claim 1, having a Cr$_2$O$_3$/TiO$_2$ weight ratio less than 30.

6. A product according to claim 1, in which:
    the alumina (Al$_2$O$_3$) content is greater than 65%; and/or
    the chromium oxide (Cr$_2$O$_3$) content is greater than 20%; and/or
    the titanium oxide (TiO$_2$) content is greater than 0.4%.

7. A product according to claim 6, in which:
    the alumina (Al$_2$O$_3$) content is greater than 69%; and/or
    the chromium oxide (Cr$_2$O$_3$) content is greater than 26%; and/or
    the titanium oxide (TiO$_2$) content is greater than 0.9%.

8. A product according to claim 1, in which:
    the alumina (Al$_2$O$_3$) content is less than 80%; and/or
    the titanium oxide (TiO$_2$) content is less than 2%.

9. A product according to claim 8, in which:
    the alumina (Al$_2$O$_3$) content is less than 75%; and/or
    the titanium oxide (TiO$_2$) content is less than 1.5%.

10. A product according to claim 1, having electrical resistivity, measured at a frequency of 100 Hz, that is greater than 250 Ω·cm at 1500° C. and/or greater than 35,000 Ω·cm at 950° C. and/or an index Ic of resistance to corrosion by an E glass of 120 or more.

11. A product according to claim 10, having electrical resistivity, measured at a frequency of 100 Hz, that is greater than 500 Ω·cm at 1500° C. and/or greater than 50,000 Ω·cm at 950° C. and/or an index Ic of resistance to corrosion by an E glass of 250 or more.

12. A product according to claim 1, in the form of a block with a mass greater than 5 kg.

13. A product according to claim 1, in which the total content of the oxides $Fe_2O_3$, $SiO_2$ and MgO is less than 0.4%.

14. A refractory element chosen among an electrode bushing block, an element in an electrolysis cell, an element of a zone of a glass furnace which may come into contact with a molten E glass and/or with a molten glass which is more resistive than E glass, and an element intended for an application in which an electrical resistivity greater than 500 Ω·cm at 1500° C. and at a frequency of 100 Hz is necessary, said refractory element having the following mean chemical composition, as a percentage by weight based on the oxides and for a total of 100%:

$Al_2O_3$: complement to 100%
$1.6\% \leqq Cr_2O_3 \leqq 35\%$
$TiO_2 \geqq 0.1\%$, the $TiO_2$ content being such that the $Cr_2O_3/TiO_2$ weight ratio is more than 16 and less than 50,
Other species: $\leqq 1\%$.

15. A refractory element according to claim 14, made of a sintered refractory product presenting an apparent density greater than 4.00 g/cm³ and having the following mean chemical composition, as a percentage by weight based on the oxides and for a total of 100%:

$Al_2O_3$: complement to 100%
$16\% \leqq Cr_2O_3 \leqq 29.5\%$
$TiO_2$ in a quantity such that the $Cr_2O_3/TiO_2$ weight ratio is greater than 16 and less than 35, and
other species: $\leqq 1\%$.

16. A method of producing a sintered product, comprising the following steps:
a) mixing starting materials to form a starting charge, the median size of the starting materials employed being less than 100 μm and being determined so that the sintered product has the following mean chemical composition, as a percentage by weight based on the oxides and for a total of 100%:

$Al_2O_3$: complement to 100%
$1.6\% \leqq Cr_2O_3 \leqq 35\%$
$TiO_2 \geqq 0.1\%$, the $TiO_2$ content being such that the $Cr_2O_3/TiO_2$ weight ratio is more than 16 and less than 50,
Other species: $\leqq 1\%$;

b) isostatic pressing to form a green part from said starting charge;
c) sintering said green part to obtain said sintered product.

17. A method according to claim 16, in which the isostatic pressing is made at a pressure greater than 100 MPa.

18. A method according to claim 16, the starting charge comprising at least 10% and less than 30% of chamotte, as a percentage by weight based on the dry weight of the starting charge.

19. A method according to claim 16, in which the dry starting charge is constituted of a powder presenting a median particles size less than 50 μm.

20. A method according to claim 16, in which the starting charge is determined so that the sintered product presents an apparent density greater than 4.00 g/cm³ and having the following mean chemical composition, as a percentage by weight based on the oxides and for a total of 100%:

$Al_2O_3$: complement to 100%
$16\% \leqq Cr_2O_3 \leqq 29.5\%$
$TiO_2$ in a quantity such that the $Cr_2O_3/TiO_2$ weight ratio is greater than 16 and less than 35, and
other species: $\leqq 1\%$.

* * * * *

UNITED STATES PATENT AND TRADEMARK OFFICE
CERTIFICATE OF CORRECTION

PATENT NO. : 8,263,514 B2
APPLICATION NO. : 12/666488
DATED : September 11, 2012
INVENTOR(S) : Olivier Citti et al.

Page 1 of 1

It is certified that error appears in the above-identified patent and that said Letters Patent is hereby corrected as shown below:

Title page, Item (73), please change "D'Etudes Europeen, Coubevoie (FR)" to --Saint-Gobain Centre de Recherches et D'Etudes Europeen, Coubevoie (FR)--; and Title page, Item (87), please change "PCT Pub. Date Jan. 5, 2009" to --PCT Pub. Date Jan. 15, 2009--.

Signed and Sealed this
Sixteenth Day of April, 2013

Teresa Stanek Rea
*Acting Director of the United States Patent and Trademark Office*